J. P. CHAMPION.

Apparatus for Raising and Securing the Legs of Horses to Shoe them.

No. 3,104. Reissued Sept. 1, 1868.

WITNESSES:
Theo Tusche
J. A. Serrine

INVENTOR.
J. P. Champion
Per Munn & Co
Attorneys

N. PETERS, Photo-Lithographer, Washington, D. C.

United States Patent Office.

J. P. CHAMPION, OF PHELPS, NEW YORK.

*Letters Patent No.* 70,523, *dated November* 5, 1867; *reissue No.* 3,104, *dated September* 1, 1868.

IMPROVEMENT IN APPARATUS FOR RAISING AND SECURING THE LEGS OF HORSES TO SHOE THEM.

The Schedule referred to in these Letters Patent and making part of the same.

TO ALL WHOM IT MAY CONCERN:

Be it known that I, J. P. CHAMPION, of Phelps, in the county of Ontario, and State of New York, did invent a certain new and improved Apparatus for Raising and Securing the Legs of Horses to Shoe them, for which Letters Patent of the United States were issued to me on the 5th day of November, 1867; and I do hereby declare that the following is a full and exact description thereof, reference being had to the accompanying drawings, making part of this specification.

Figure 1:
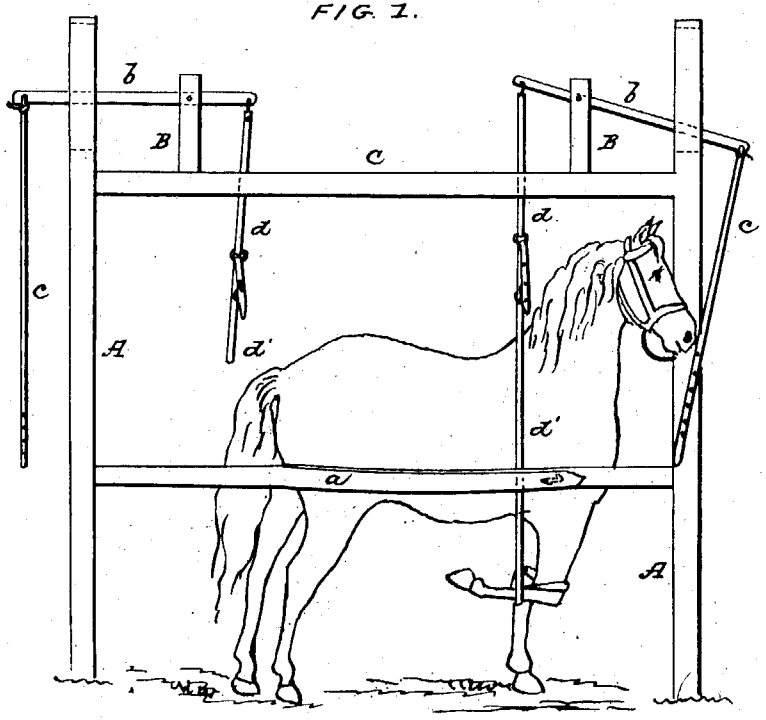

Figure 1 is a side view of my improved apparatus.

Figure 2:
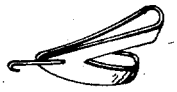
Figure 3:
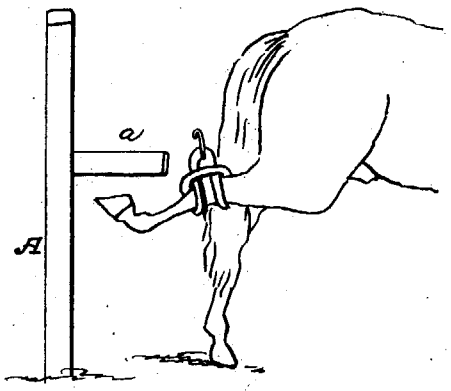

Figures 2 and 3, views of modified forms of the straps for securing the leg.

Like letters of reference indicate corresponding parts in all the figures.

The object of this invention is to raise and secure the legs of a horse in order to shoe or otherwise handle him safely with impunity, and it consists of a lever-apparatus connected with a suitable frame, and so arranged that it may be securely connected with the legs, which can then be raised and retained in any desired position.

In the drawings, A A represent four posts or standards, with rails, C C, connecting them, and with straps, *a a*, at the sides.

To studs, B B, of the frame are pivoted levers *b b*, playing freely. To one end of these levers are attached straps *d d'*, which connect with the horse's legs; and at the opposite end are fastened connections *c c*, which serve to actuate the levers.

I prefer to make the straps *d d'* in two parts, which buckle up to shorten or lengthen at pleasure. These straps may be secured to the horse's leg by winding around, or a loop or noose may be employed, as shown in figs. 2 and 3.

The operation will be readily understood. The straps *d d'*, being attached to the horse's leg, the latter is drawn up, and the lever *b* secured. The shoe is then replaced at pleasure. This arrangement of the levers in connection with the frame is very effective in practice.

What I claim as my invention, and desire to secure by Letters Patent, is—

The lever-apparatus, for raising and securing horses' legs, employed in connection with a suitable frame, arranged and applied substantially as herein shown and described.

J. P. CHAMPION.

Witnesses:

H. H. FRAZER,

OZIAS SHERMAN.